(12) United States Patent
Montgomery et al.

(10) Patent No.: US 8,251,561 B2
(45) Date of Patent: Aug. 28, 2012

(54) LIGHT COLLIMATING LIGHTGUIDE

(75) Inventors: David J. Montgomery, Oxfordshire (GB); Ioannis Papakonstantinou, London (GB)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 12/479,330

(22) Filed: Jun. 5, 2009

(65) Prior Publication Data
US 2010/0309688 A1    Dec. 9, 2010

(51) Int. Cl.
*F21V 7/04* (2006.01)
(52) U.S. Cl. ........ 362/610; 362/619; 362/620; 362/625; 362/626; 362/628; 385/146
(58) Field of Classification Search .................. 362/610, 362/619, 620, 625, 626, 628; 385/146
See application file for complete search history.

(56) References Cited

U.S. PATENT DOCUMENTS

| 5,980,054 | A | * | 11/1999 | Fukui et al. | 362/625 |
| 7,931,396 | B2 | | 4/2011 | Suckling et al. | |
| 2005/0073756 | A1 | | 4/2005 | Poulsen | |
| 2006/0087867 | A1 | | 4/2006 | Kim | |
| 2007/0058259 | A1 | | 3/2007 | Hwang et al. | |
| 2007/0133097 | A1 | | 6/2007 | Lubart et al. | |
| 2007/0247872 | A1 | | 10/2007 | Lee et al. | |
| 2008/0062686 | A1 | | 3/2008 | Hoelen et al. | |
| 2008/0110358 | A1 | | 5/2008 | Kanga | |

FOREIGN PATENT DOCUMENTS

| JP | 2000-294022 A | 10/2000 |
| JP | 2002-042530 A | 2/2002 |
| JP | 2006-120591 A | 5/2006 |
| WO | 2007/144805 | 12/2007 |
| WO | 2008/047292 | 4/2008 |

* cited by examiner

*Primary Examiner* — Stephen F Husar
(74) *Attorney, Agent, or Firm* — Renner, Otto, Boisselle & Sklar, LLP

(57) ABSTRACT

A backlight is provided for illuminating an at least partially transmissive display. The backlight includes a light source. A lightguide receives the light from an edge surface and guides the light by total internal reflection. The lightguide also has features that exist on one or more lightguide surfaces in the shape of a triangular wedge that reduces the range of angles in the vertical direction within the lightguide. This arrangement enables improved angular performance from out-coupled light.

32 Claims, 7 Drawing Sheets

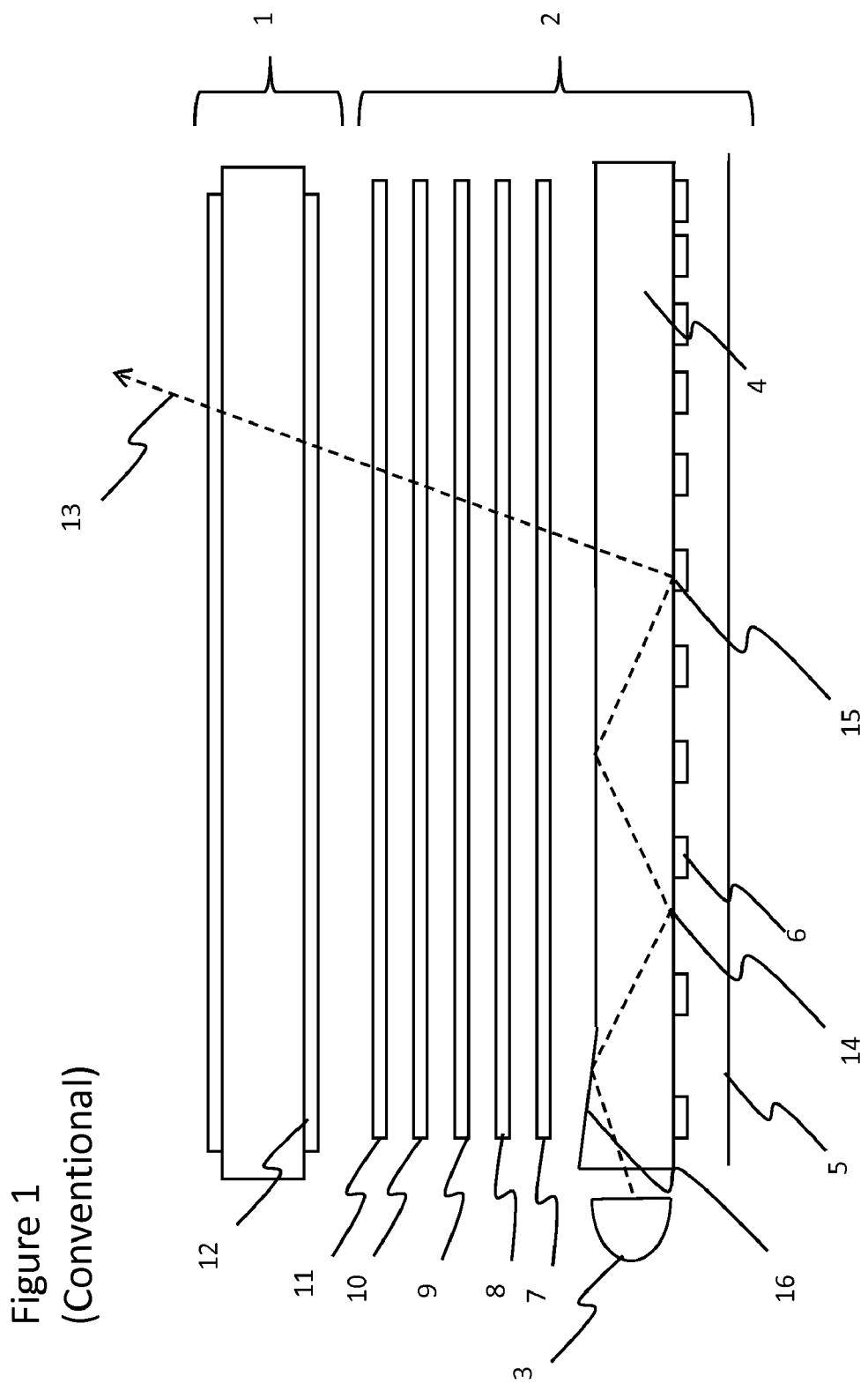
Figure 1
(Conventional)

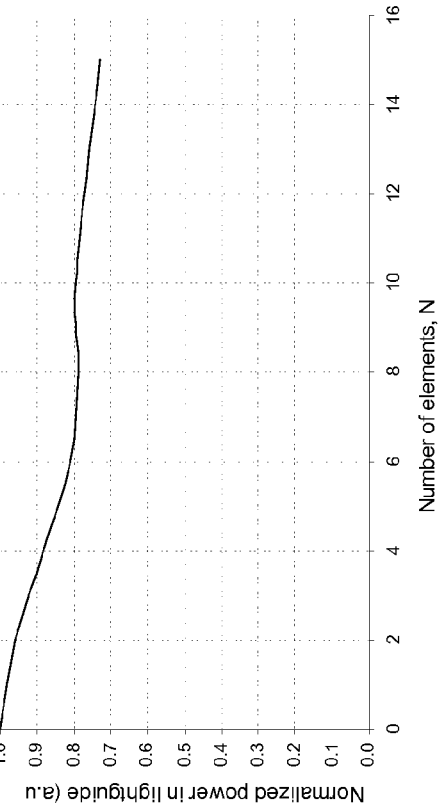
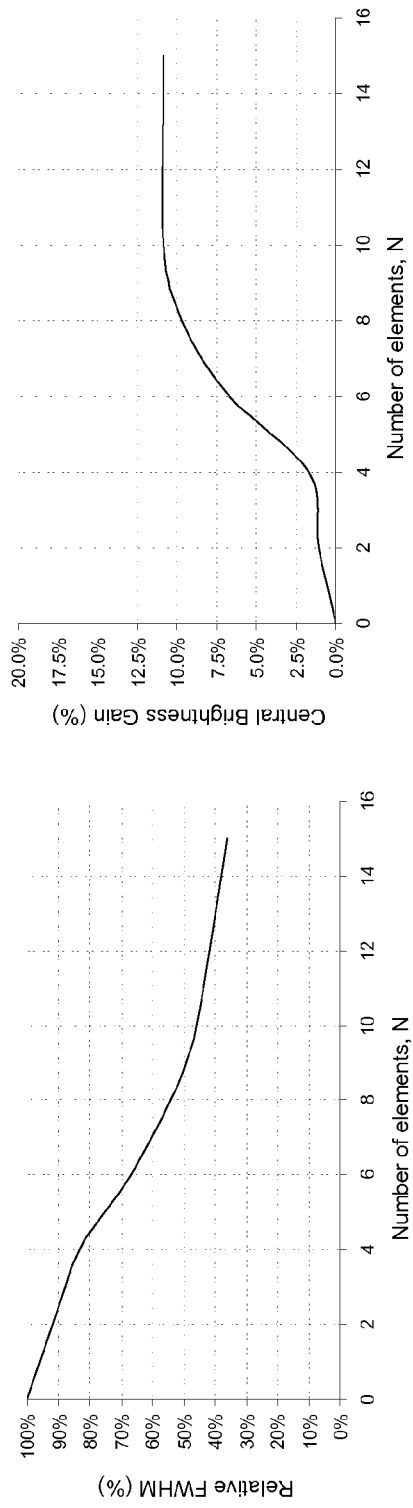
Figure 4a
Figure 4b
Figure 4c

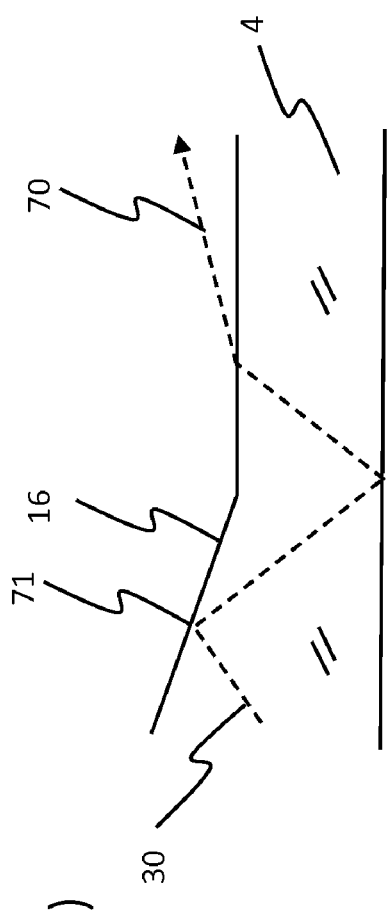
Figure 7a (Conventional)

LIGHT COLLIMATING LIGHTGUIDE

TECHNICAL FIELD

The present invention relates to a backlight, for example, for use with an at least partially transmissive spatial light modulator. The present invention also relates to a display including such a backlight, and to a distributed illumination panel that may be used for general illumination. More particularly, the invention relates to an apparatus and method for reducing the range of angles present in a vertical direction in a lightguide illuminated by a non-collimated light source.

BACKGROUND OF THE INVENTION

FIG. 1 of the accompanying drawings illustrates the stack structure of a typical liquid crystal display (LCD) module of small size, for example for a mobile phone or PDA device. The display comprises a flat transmissive spatial light modulator (SLM) in the form of an LCD panel having input and output polarisers on its bottom and top sides. The rest of the structure is generally regarded as the backlight system, as follows. A light source (for example an LED or Laser) emits light, which is coupled into a light guide and distributed across the back of the display by way of total internal reflection (TIR) in such a way that if no scattering structures were present the light would travel until it reached the end of the light guide. Within the light guide there are multiple scattering structures that extract the light from the light guide to illuminate the LCD panel by disrupting the TIR conditions at the surface of the light guide on which they are located, hence allowing the light to pass through an external medium (e.g., the air-lightguide interface). These scattering features may be located on either the top or bottom major lightguide surfaces. The density of the light scattering features may increase with distance from the light source to maintain a uniform rate of extraction of the light along the length of the lightguide. As light is extracted both down and up from the lightguide, a reflecting film is placed beneath the lightguide to improve the efficiency of the backlight. There are also some optical films between the lightguide and the LCD panel, placed to give better illumination uniformity over the display area and to enhance brightness within a given viewing angle range. These films typically consist of diffuser layers and prism films that enhance the central brightness of the backlight. The form of these structures are well known in the prior art and will not be discussed further here.

The features that extract the light can take many forms, and the particular form that the extraction takes can determine the angular profile of the lightguide emission, which then can be diffused or utilized in some manner. For example, in backlights that require the lightguide to produce collimated emission, the form of the emission will be very sensitive to the range of angles of the light in the lightguide. Other potential extraction, such as sub-wavelength, diffractive or holographic features, will also be dependent on the angle range for the quality of their extraction profile.

Another potential backlight is one that has wedge-type extraction that produces a collimated beam to enter a lens array to control direction on bending. The limiting factor in the minimum bend radius for a given lens pitch is the range of angles the lightguide emits, especially in a vertical direction. This is dependent on the range of angles that exists in the lightguide.

U.S. patent application Ser. No. 12/331,901 relates to a method to control the direction of the light in a lightguide. The method involves triangular shaped features positioned substantially parallel with the direction of the light coupled into the lightguide. The patent discloses a method for directing the light in a horizontal direction to reduce mixing region and more efficiently distributing light in a lightguide of unusual shape.

WO2008/047292 (Philips Electronics) describes a funnel-shaped reflector which collimates light in both viewing directions to enhance LED brightness. It is mainly aimed at general lighting applications and funnel has to be long for efficient collimation.

WO2007/144805 (Philips Electronics) describes a collimating and color mixing arrangement encapsulated to the LED chip. It comprises a lens placed in front of the LEDs and triangular features made of dichroic film, which enhance the overall LED brightness.

Both of the above patents relate to improving relative collimation between colour LEDs, rather than controlling the collimation itself.

US 2007/0133097 (Brilliant Film LLC) describes a set of films with concave, lens-type, refraction structures for collimating light out-coupled from lightguide in both viewing directions. Design concerns controlling light extracted from the lightguide.

US 2007/0058259 (Samsung Electronics) describes a set of films with BEF like structures for collimating light out-coupled from lightguide in both viewing directions. Design also concerns controlling light extracted from the lightguide.

US 2008/0062686 (Philips Electronics) describes an illumination system comprised of a light-collimation section, a light-mixing section and a light-shaping diffuser. This set of components is attached to the front of a lightguide to provide with uniform light, eliminating spatial and color mixing regions. Since it is an external component it adds an extra assembly step and also can be relatively expensive.

US 2008/0110358 (Xiper Innovations INC.) describes a collimating bar made by a Fresnel type, cylindrical, aspherical lens. Alignment between LEDs-Fresnel lenses is required in this type of systems making fabrication more complex. The sheet also needs some controlled separation from the light source.

US 2007/0247872 (Samsung Electronics) describes a collimating bar made of a series of triangular structures arranged horizontally along the lightguide input. Light is collimated in horizontal direction only.

US 2005/0073756 (P. Poulsen) describes a light collimator which comprises an array of elongated reflective channels. The light is then collimated by another film. The features here act as extraction features and do not reduce the spread of angles in the lightguide vertically.

SUMMARY OF THE INVENTION

The present invention provides an apparatus and method for improving collimation. According to a first aspect of the invention, a lightguide is provided for use in distributing light received from a light source, wherein the lightguide exists as part of a backlight assembly for a spatial light modulator. For example this could be a liquid crystal display (LCD) or other display device that utilizes a backlight. The backlight unit can include a reflecting assembly on the opposite face from the LCD and not in contact with the lightguide. The light source may be illuminating another face of the lightguide that may be much smaller in area than the first two faces, and a substantial part of the light may be transmitted by total internal reflection across the lightguide. The lightguide includes at least one layer in substantial optical contact with adjacent layers. At least one face or interface between layers includes a structure that, when combined, will out-couple light from the lightguide.

In accordance with one aspect of the present invention, arranged on the lightguide are features (e.g., linear features) that are positioned in front of the light sources (e.g., LEDs or other light sources). The features are in straight lines perpendicular to the general direction of the light emitted from the LEDs. The feature cross section includes a sloping "right-angled" triangle with the slope towards the light source. The cross section may be the same across the length of the features. Additionally, the features may be positioned on one or both top and bottom surfaces of the lightguide.

There may be a small number of features that do not extend along the length of the lightguide away from the light sources. The features also may not extend all of the way across the lightguide and be localized simply at the light sources.

The features improve the collimation of the light in the lightguide to a level closer to the etendue of the original light source and will improve the operation of extraction features that depend on the angular spread of light in a vertical direction. The features can be integral to the lightguide and do not require additional processing or extra space for their operation. The features do reduce the total amount of light in the lightguide, but the improvement in collimation is much improved allowing a higher quality backlight to be achieved.

In a further aspect in accordance with the invention, the size and depth of each feature is different from one another, while maintaining a constant cross section within one feature. This may apply to all of the aspects of this embodiments mentioned herein.

In a yet further aspect in accordance with the invention, the triangle cross section of the features may not be "right angled", and they may be asymmetric on the top and bottom surfaces. This enables the collimation axis to be different from that parallel to the lightguide sides.

In a yet further aspect in accordance with the invention, the features can be used on the far side of a taper feature in the lightguide to reduce the loss caused by the taper feature.

According to one aspect of the invention, a lightguide for providing light in a display device includes a lightguide substrate comprising first and second major faces and an edge face there between into which light from a light source is injected, the lightguide substrate configured to transfer the light between the first and second major faces by total internal reflection, an optical axis generally parallel to the first and second major faces and defining a nominal illumination direction through the lightguide, and an extraction region for extracting light from the lightguide. The lightguide includes at least one feature formed on at least one of the first and second major faces between the edge face and the extraction region, said at least one feature configured such that a beam of light incident on the at least one feature is refracted back into the lightguide at a lower angle to the optical axis than the incident beam.

According to another aspect of the invention, light from the incident beam that exits the lightguide between the edge face and the extraction region exits the lightguide at a first surface of the at least one feature, passes through an external medium, and reenters the lightguide at a second surface of the at least one feature.

According to another aspect of the invention, light from the incident beam impinging on the first surface is at a first angle relative to the optical axis prior to exiting the lightguide, and upon entering the external medium light from the incident beam is refracted at a second angle relative to the optical axis, wherein the second angle is less than the first angle, and upon entering back into the lightguide at the second surface, light from the incident beam is refracted at a third angle relative to the optical axis, wherein the third angle is less than the first angle.

According to another aspect of the invention, the at least one feature is formed as a lenticular line.

According to another aspect of the invention, a shape of the lenticular line is formed to have a triangular cross section.

According to another aspect of the invention, the triangular cross section comprises a right-triangle.

According to another aspect of the invention, the second surface of the at least one feature is normal to the optical axis.

According to another aspect of the invention, the at least one feature is lenticular across an entire width of the lightguide.

According to another aspect of the invention, the at least one feature is lenticular in a predetermined position on the lightguide.

According to another aspect of the invention, the at least one feature comprises a plurality of features each having a respective feature angle, and the respective feature angles of each of the plurality of features are different from one another.

According to another aspect of the invention, the respective feature angles are a function of a distance of the respective feature from the edge face.

According to another aspect of the invention, the triangular cross section comprises a non-right angle triangular cross section.

According to another aspect of the invention, the lightguide further includes at least one second feature formed on a side opposite the at least one first feature, the at least one second feature including a first side sloping toward the edge face, and a second side at an angle to the edge that is greater than 90 degrees.

According to another aspect of the invention, the lightguide includes a tapered section adjacent to the edge face that creates an exit point at which light exits from the lightguide, and the at least one feature is located at the exit point so as to re-couple light exiting from the lightguide back into the lightguide.

According to another aspect of the invention, the at least one feature includes a plurality of features that are formed on the first and second faces of the lightguide, and a number of features on the first face is different from a number of features on the second face.

According to another aspect of the invention, features on the first face are positionally offset relative to features on the second face.

According to another aspect of the invention, the plurality of features are formed integral with the lightguide.

According to another aspect of the invention, each feature of the plurality of features has different dimensions than other features of the plurality of features.

According to another aspect of the invention, the at least one feature includes a plurality of lenticular features, and a cross section of each lenticular feature remains constant.

According to another aspect of the invention, a backlight includes the lightguide in accordance with the above aspects of the invention.

According to another aspect of the invention, a display device includes the backlight.

According to another aspect of the invention, a method for improving collimation in a lightguide that includes first and second major faces between which light is reflected by total internal reflection, a first region for receiving light from a light source, a second region for extracting light from the lightguide, and an optical axis generally parallel to the first and second major faces that defines a nominal illumination axis of the light. The method includes refracting a beam of light exiting the lightguide between the first region and the second region back into the lightguide, wherein, relative to the optical axis, an angle of the refracted light after entering back into the lightguide is lower than an angle of light incident on a face of the lightguide prior to the light exiting the lightguide.

According to another aspect of the invention, the lightguide includes at least one feature located between the first and second regions, and refracting includes the incident beam exiting the lightguide at a first surface of the at least one feature, passing through an external medium, and reentering the lightguide at a second surface of the at least one feature.

According to another aspect of the invention, refracting further includes light from the incident beam, prior to exiting the lightguide, impinging on first surface at a first angle relative to the optical axis, and upon entering the external medium light from the incident beam is refracted at a second angle relative to the optical axis, wherein the second angle is less than the first angle, and upon entering back into the lightguide at the second surface, light from said incident beam is refracted at a third angle relative to the optical axis, wherein the third angle is less than the first angle.

According to another aspect of the invention, the method includes using at least one feature to having a triangular cross section.

According to another aspect of the invention, the method includes using at least one feature having a triangular cross section that comprises a non-right angled triangular cross section.

According to another aspect of the invention, the method includes using at least one feature that is lenticular across an entire width of the lightguide.

According to another aspect of the invention, the method includes using at least one feature that is lenticular in a predetermined position on the lightguide.

According to another aspect of the invention, the lightguide comprises a tapered section in the first region that creates a light exit point, the method further including re-coupling light exiting from the light exit point to the lightguide.

According to another aspect of the invention, re-coupling includes using the at least one feature at the light exit point.

According to another aspect of the invention, the method further includes using a plurality of features on at least two different surfaces of the lightguide, and a number of features on a first surface of the at least two different surfaces is different from a number of features on a second surface of the at least two different surfaces.

According to another aspect of the invention, the method further includes using a plurality of features on at least two different surfaces of the lightguide, wherein the features on the first and second sides are positionally offset relative to one another.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 illustrates a conventional backlight.

FIG. 4a illustrates the loss of energy in the lightguide as a function of the number of stripes.

FIG. 4b illustrates the increase in collimation (reduction in FWHM) as a function of the number of stripes FIG. 4c illustrates the increase in on-axis brightness in the lightguide as function of the number of stripes.

FIG. 7a illustrates loss due to the taper in a conventional device.

DETAILED DESCRIPTION OF THE INVENTION

Figure 2:
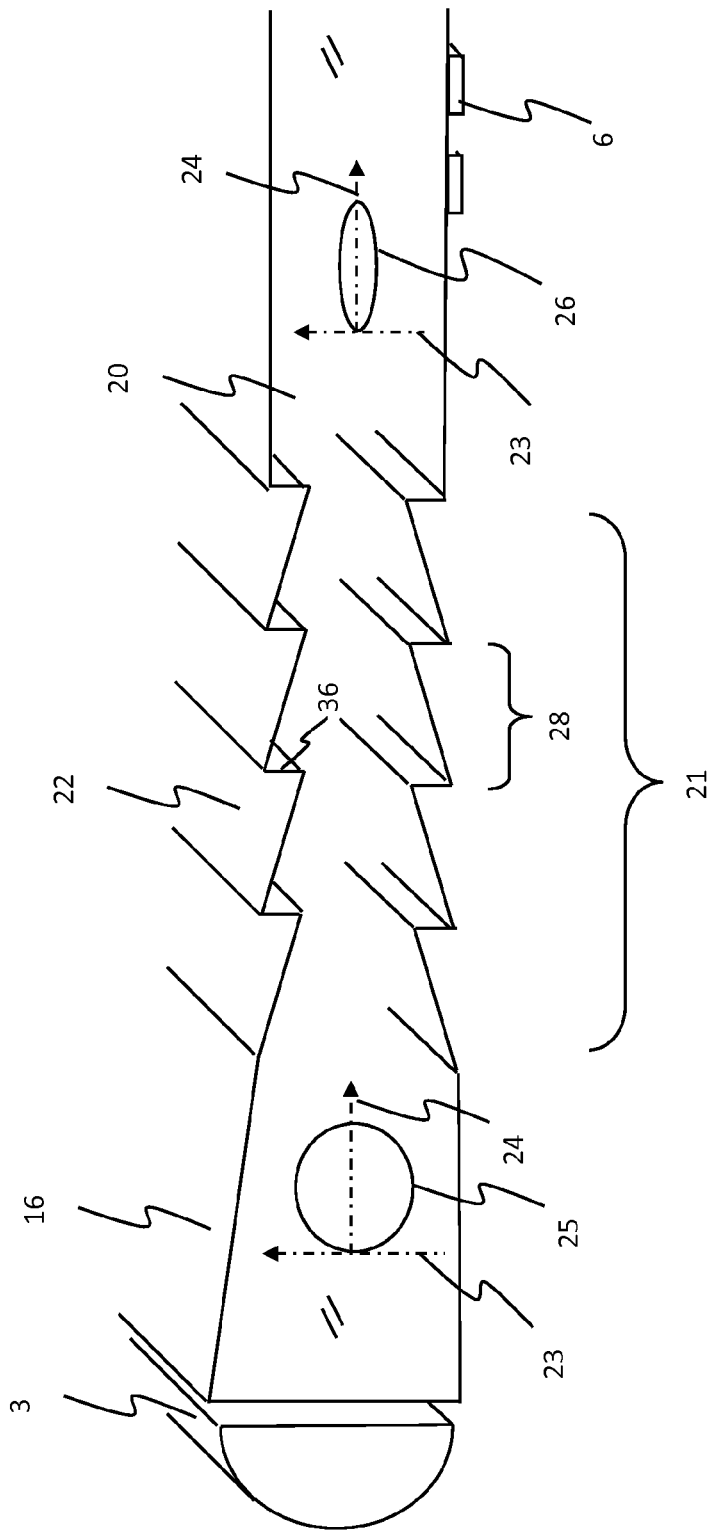
FIG. 2 illustrates an overview of an exemplary device in accordance with the invention.

The present invention will now be described in detail with reference to the drawings, in which like reference numerals are used to refer to like elements throughout.

FIG. 1 illustrates a conventional small area liquid crystal display. The display includes a liquid crystal display panel 1 and a backlight unit 2. A white light source 3, which can be a fluorescent tube, a LED with phosphor, RGB LED group, a laser or other light source, is positioned to inject light into the edge of a thin lightguide 4. The lightguide 4 is designed to transfer by total internal reflection (TIR) 14 the light across the area of the display. The lightguide 4 may have a taper 16 on one of the larger sides near the light sources to allow a thinner lightguide. At least one large face, which can be the top, bottom (illustrated) or both faces, has features 6 that disrupt the TIR 14 in the lightguide so that the light 13 leaves the lightguide. The light that leaves the lightguide generally has the wrong angular brightness characteristics for the display, so four additional layers, a strong diffuser 7, two crossed prism sheets 8 and 9 in orthogonal directions and a weak diffuser 10 are used to produce the correct angular distribution. In many cases the weak diffuser 10 is incorporated into the top prism layer 9. A further layer 11 can be a polarization conversion film, which is typically an interference film that reflects one polarization and transmits the other to improve efficiency. Above the layer 11 is layer 12, which can be a lower polarizer of the LCD.

Referring to FIG. 2, a preferred embodiment of a device in accordance with the present invention includes a lightguide 20. The lightguide 20 is similar to the conventional lightguide 4 except for the differences described herein. The differences pertain to the lightguide alone, and the other features of the backlight remain the same as in FIG. 1.

The lightguide 20 is illuminated by a light source 3 (for example an LED, laser or fluorescent tube light source) in which a majority of the emitted light is incident into the lightguide 20. The lightguide 20 may have a taper 16, but this is not germane to the invention. The lightguide 20 also includes out-coupling features 6 (e.g., within the extraction region of the lightguide) that out-couple the light in a uniform fashion from the lightguide 20.

The lightguide 20 has a set of cut-away features 21 between the light source and extraction point. These features include one or more lenticular features 28 of constant identical cross section arranged as "rows" substantially perpendicular to an optical axis 24 of the lightguide 20, wherein the optical axis 24 is parallel to the major faces of the lightguide 20. It is noted, however, that when considered from a local point of view, the optical axis direction may be defined by the average direction of light, which may not be parallel to the major faces of the lightguide. The cross section of the features comprise a triangle with one angle substantially a right angle and one surface of the lightguide 20 being one side meeting the right angle of the triangle. The sloping side 22 of the triangle faces the light source 3. The vertical side 36 (or face) of the features 21 are substantially perpendicular to the nominal direction 24 of light from the light source 3 (optical/main axis 24).

The features 21 may be on one or more surfaces of the lightguide 20 and may have different numbers on different surfaces, and the features 21 may be offset from each other. The features 21 may be positioned near the light source 3, but can also be placed elsewhere in the lightguide 20. The features 21 also may not be lenticular across the entire width of the lightguide 20 but localized in specific positions. The features 21 can be formed in a lightguide mold and thus can be manufactured without significant additional cost.

With continued reference to FIG. 2, the illumination inside the lightguide 20 is shown by two axes, one along the nominal illumination direction 24 (optical/main axis) and another in a direction perpendicular to the largest surfaces of the lightguide 23 (a vertical direction). The illumination is shown in a polar plot 25 relative to these directions.

The action of the features 21 is to reduce the angular spread of the light relative to the optical axis 24, and is shown by the oblong polar plot 26. The reduced range of light angles in the vertical direction 23 will allow improved performance from extraction features 21 where angular spread is an important factor.

Figure 3:
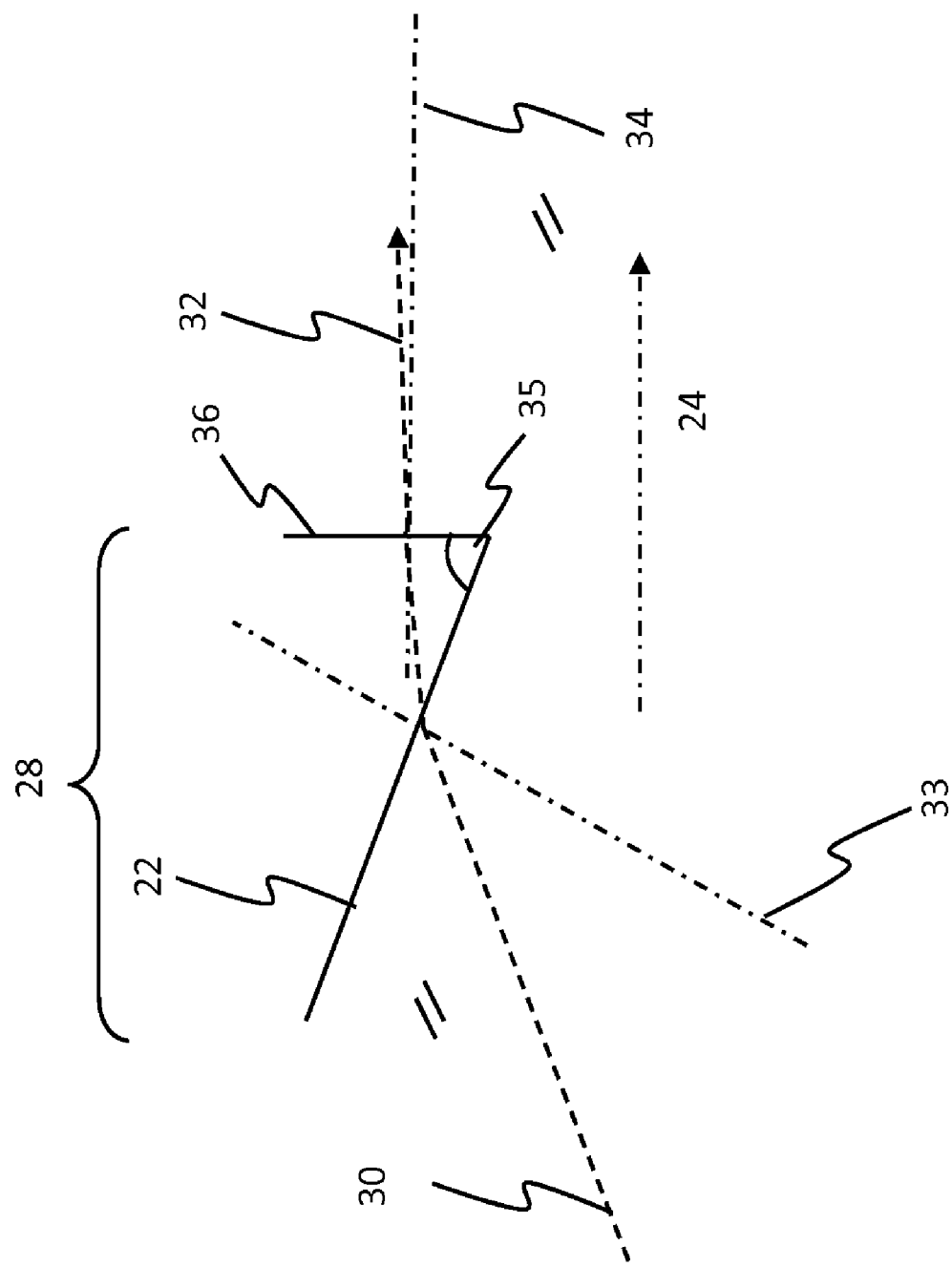
FIG. 3 illustrates the detail of the diffractive layer of the device shown in FIG. 3.

Operation of the features is shown in FIG. 3. Incident light 30 at some angle to the axis 24 is refracted by the sloped side 22 and again at the vertical side 36. The resultant beam 32 is at a lower angle to the axis 24 than the incident beam (e.g., the resultant beam 32 is closer to being parallel to the axis 24 than the incident beam 30). This is because the normal to the sloping side 33 with the light passing into air is at a high angle to the axis, and thus the emerging light is deflected at a lower angle to the axis 24. The vertical surface 36 has its normal 34 substantially parallel to the optical axis 24, thus the incident light, passing back into glass, is directed back into the lightguide at a still lower angle.

It is noted that rays already at a small angle to the optical axis 24 could be totally internally reflected from the sloping side 22. In certain circumstances these rays would be lost, thus reducing efficiency. To minimize such loss, an LED source 3 with high off-axis flux (i.e., a significant amount of light at a high angle to the optical axis 24) and preferably with a low on-axis flux (i.e., low light in the direction of the optical axis 24) can be used with the lightguide in accordance with the present invention.

A loss mechanism in the lightguide 20 is caused when light 30 or 32 reaches the sloping side 22 and is totally internally reflected. In this case the light is at a high angle to the axis 24, but may be re-coupled by the features 21. Thus there is a trade between the number of features 21 and the feature peak angle 35. However it is possible to gain an overall improvement in the performance of the system despite the loss.

For example, in FIGS. 4a, 4b and 4c a particular case is modeled for identical features 21 and a typical LED illumination in a polycarbonate lightguide 20 (refractive index 1.585). The top angle 35 is 75 degrees, feature pitch is 50 µm, feature height 11 µm with features 21 on both surfaces. FIG. 4a shows the total energy in the lightguide 20 as a function of the number of lenticular features. FIG. 4b shows the improvement in collimation shown by a reduction in full width half maximum, and FIG. 4c shows the improvement in irradiance along the optical axis 24.

For ten lenticular features, a reduction of angular spread by a factor of 2.13 and an increase in on-axis irradiance of 11% is seen for a 20% loss in total energy. This will improve the out-coupled collimation of the lightguide 20 by a factor of >2.13*1.11*0.8=1.89.

The invention is not limited to these specific numbers but to the general concepts described in the preferred embodiment.

Figure 5:
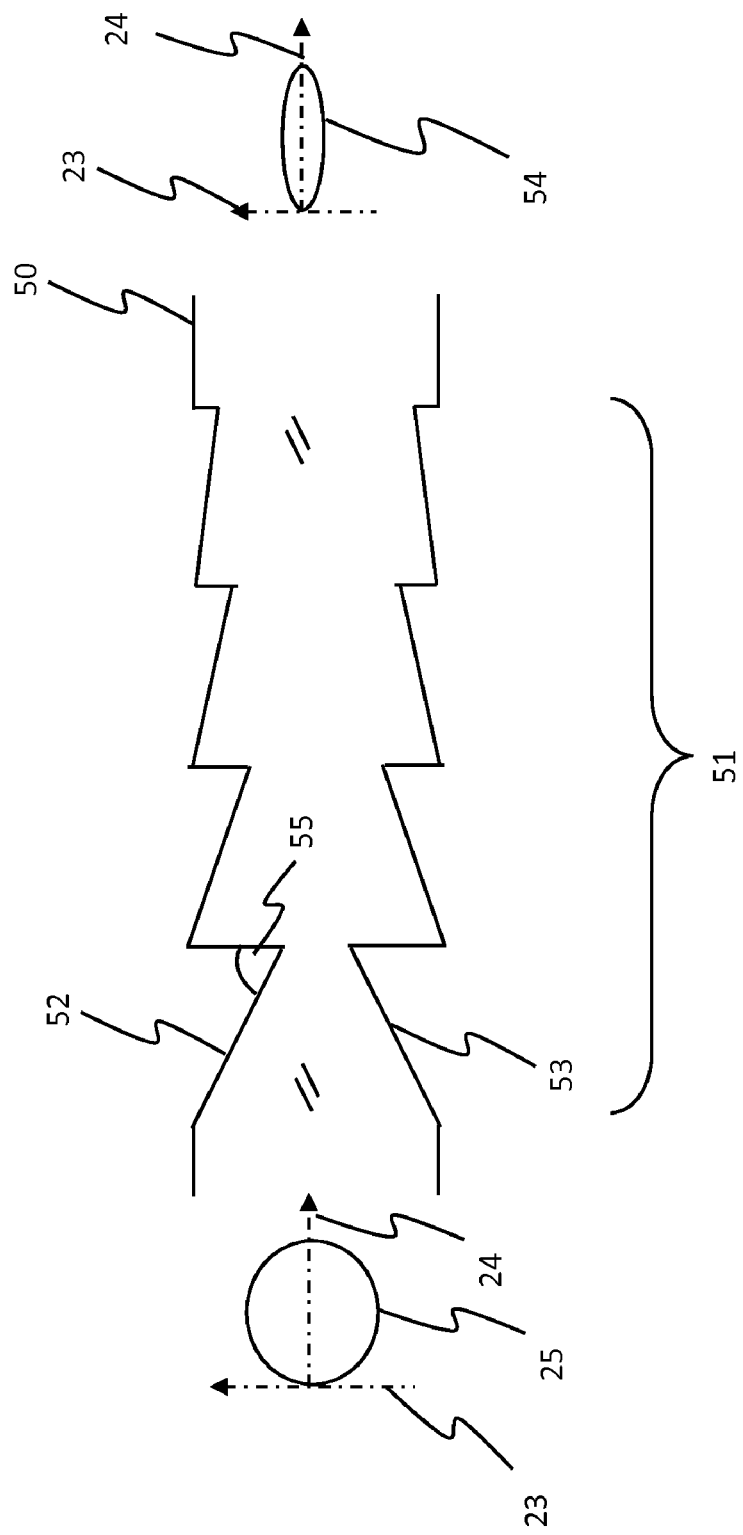
FIG. 5 illustrates another exemplary device with different cross sections in accordance with present invention.

FIG. 5 shows another exemplary device in accordance with the invention, whereby a lightguide 50 involves a different set of features 51. These features 51 include more than one lenticular feature 52, where within each line the cross section remains the same, but different lines have a different feature angle 55. The arrangement may be accompanied by lower face lenticular features 53 following an identical pattern, or a different arrangement that may be offset from the other arrangement in the direction of the optical axis 24. The angle 55 may be an increasing function with distance from the light source 3 along the axis direction 24. The result of the features is a collimated beam 54 shown on the same scale as previously, but with a reduced loss from the lightguide.

Figure 6:
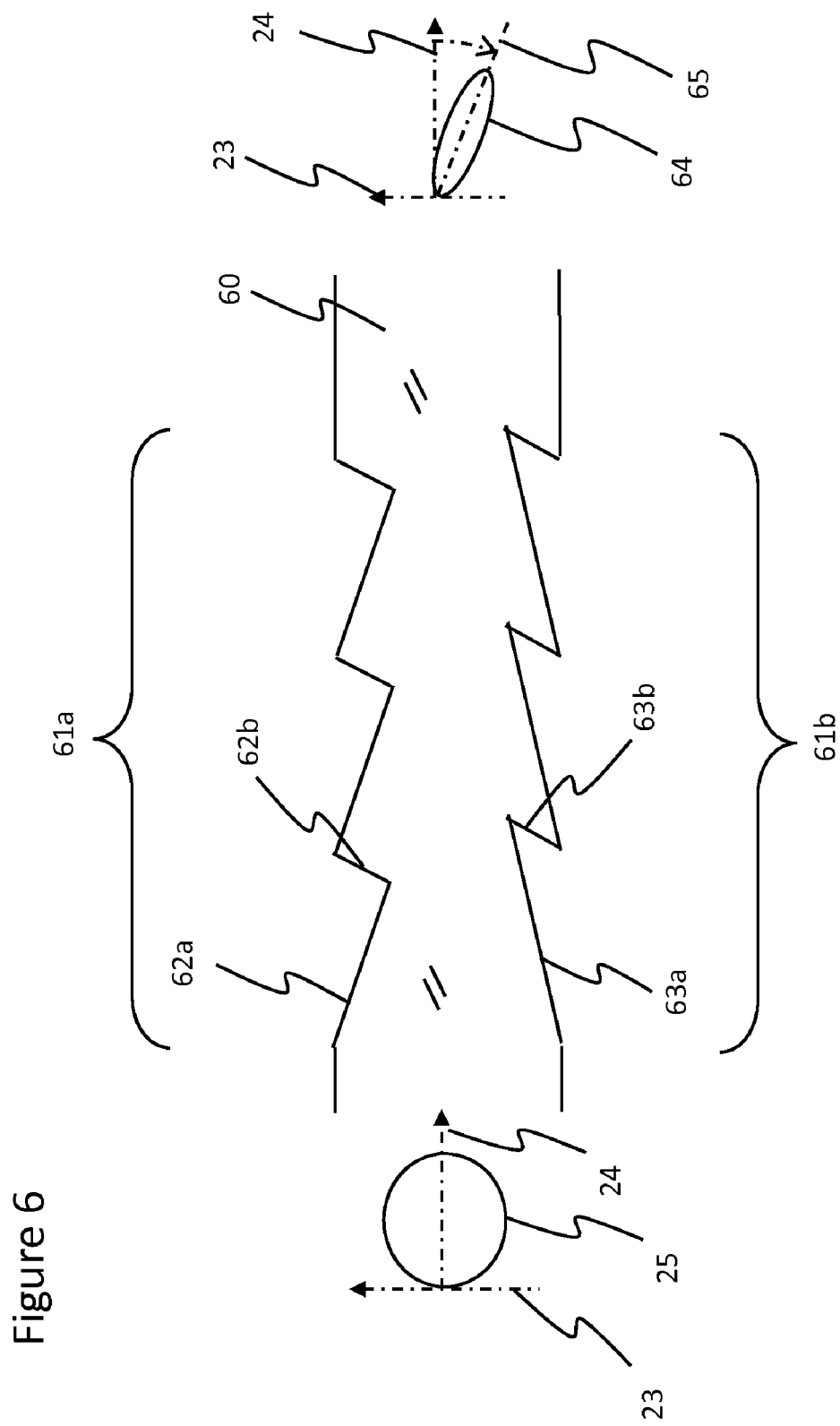
FIG. 6 illustrates another exemplary device with asymmetric features in accordance with the present invention.

FIG. 6 shows yet another exemplary device in accordance with the invention, wherein a lightguide 60 is described with a set of one or more features 61a. The top surface features now include lenticular features that have constant cross section, but the shape of the features 61a is now of a non-right angled triangle. The long sloping side 62a is still towards the light source 3, but the short side 62b is now at an angle to the optical axis 24 that is not 90°. The effect of this is to direct the light away from the optical axis 24 towards a new direction 65 at a downward angle.

This aspect may be accompanied by additional features 61b on the lower surface where the sloping side 63a directed towards the light source 3 has a second side 63b at an angle to the edge that is substantially parallel to the edge 62b, but the length of the sloping side 63a is different from that of the opposing side 62a. The internal angles of the triangle formed by sides 62a and 62b and the triangle formed by 63a and 63b are different, though the lengths of sides 62b and 63b may be the same.

This will act to direct the light in a direction 65 downwards. The features 61a and 61b on the top and bottom surfaces can be reversed to direct the light upwards. The features 61a and 61b also improve the collimation 64 along this new direction. The features 61a and 61b may also be reduced in size as a function of position from the light source 3 along the optical axis direction 24.

With reference to FIG. 7a, there is shown a particular issue with a taper 16 that is integral with most lightguides 4 in small backlights. The taper 16 allows space for additional films to be placed above the lightguide 4 and for a larger light source than is required by the thickness of the lightguide 4. The problem is that there is some loss from this taper 16 due to incident light 30 being total internally reflected at a sloping interface 71 such that the light is no longer in-coupled and is extracted 70.

Figure 7B:
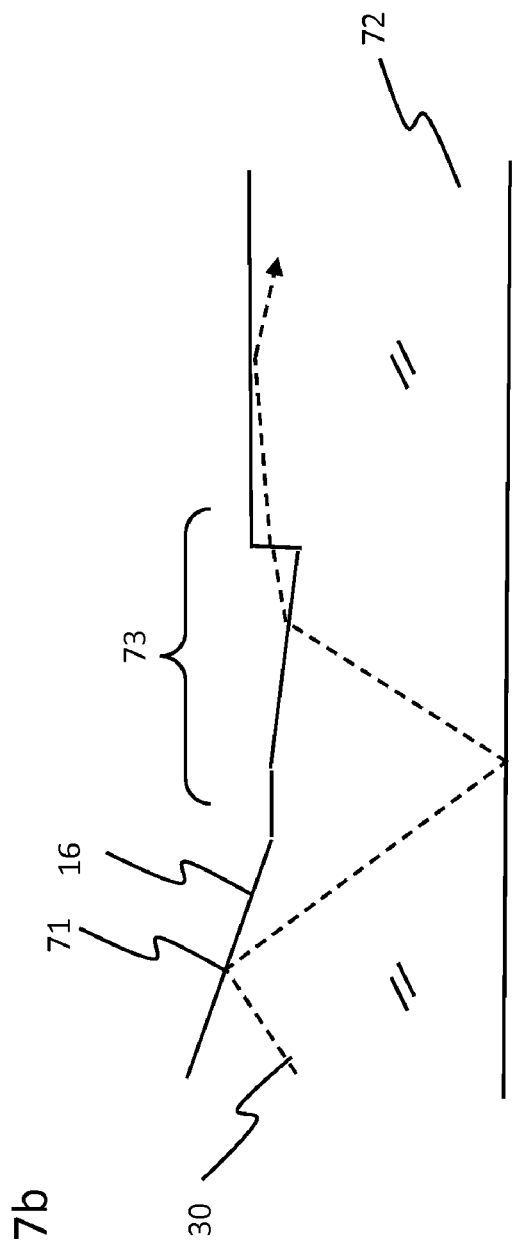
FIG. 7b illustrates another exemplary device with reduced taper loss in accordance with the present invention.

Moving to FIG. 7b, there is shown a lightguide 72 in accordance with another aspect of the invention, wherein the lightguide 72 has a taper 16. In this lightguide 72, there are one or more features 73 in a shape described above whereby the light lost due to the taper is re-coupled back into the lightguide 72. This is accomplished, for example, by arranging a feature at the point at which light exits the lightguide immediately after the taper. The one or more features 73 may have one or more identical features on the lower surface (not shown).

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A lightguide for providing light in a display device, comprising:
    a lightguide substrate comprising
    first and second major faces and an edge face there between into which light from a light source is injected, the lightguide substrate configured to transfer the light between the first and second major faces by total internal reflection,
    an optical axis generally parallel to the first and second major faces and defining a nominal illumination direction through the lightguide, and
    an extraction region for extracting light from the lightguide; and
    a plurality of features formed on at least one of the first and second major faces between the edge face and the extraction region, said plurality of features configured such that a majority of the light from the light source incident on the plurality of features is refracted back into the lightguide at a lower angle to the optical axis than light incident on a face of the lightguide to reduce an angular spread of light relative the optical axis.

2. The lightguide according to claim 1, wherein light from said incident beam that exits the lightguide between the edge face and the extraction region exits the lightguide at a first surface of the a first feature of the plurality of features, passes through an external medium, and reenters the lightguide at a second surface of the first feature of the plurality of features.

3. The lightguide according to claim 2, wherein light from said incident beam impinging on the first surface is at a first angle relative to the optical axis prior to exiting the lightguide, and upon entering the external medium light from said incident beam is refracted at a second angle relative to the optical axis, wherein the second angle is less than the first angle, and upon entering back into the lightguide at the second surface, light from the incident beam is refracted at a third angle relative to the optical axis, wherein the third angle is less than the first angle.

4. The lightguide according to claim 1, wherein the plurality of features are formed as a lenticular line.

5. The lightguide according to claim 4, wherein a shape of the lenticular line is formed to have a triangular cross section.

6. The lightguide according to claim 5, wherein the triangular cross section comprises a right-triangle.

7. The lightguide according to claim 2, wherein the second surface of the at least one feature is normal to the optical axis.

8. The lightguide according to claim 1, wherein the plurality of feature are lenticular across an entire width of the lightguide.

9. The lightguide according to claim 1, wherein the plurality of features are lenticular in a predetermined position on the lightguide.

10. The lightguide according to claim 1, wherein the at least one feature comprises a plurality of features each having a respective feature angle, and the respective feature angles of each of the plurality of features are different from one another.

11. The lightguide according to claim 10, wherein the respective feature angles are a function of a distance of the respective feature from the edge face.

12. The lightguide according to claim 5, wherein the triangular cross section comprises a non-right angle triangular cross section.

13. The lightguide according to claim 12, further comprising at least one second feature formed on a side opposite the at least one first feature, said at least one second feature including a first side sloping toward the edge face, and a second side at an angle to the edge that is greater than 90 degrees.

14. The lightguide according to claim 1, wherein the at least one feature comprises a plurality of features that are formed on the first and second faces of the lightguide, and a number of features on the first face is different from a number of features on the second face.

15. The lightguide according to claim 14, wherein features on the first face are positionally offset relative to features on the second face.

16. The lightguide according to claim 1, wherein the plurality of features are formed integral with the lightguide.

17. The lightguide according to claim 1, wherein each feature of the plurality of features has different dimensions than other features of the plurality of features.

18. The lightguide according to claim 1, wherein the plurality of features include a plurality of lenticular features, and a cross section of each lenticular feature remains constant.

19. A backlight for a display device, comprising the lightguide according to claim 1.

20. A display device, comprising the backlight according to claim 19.

21. A lightguide for providing light in a display device, comprising:
    a lightguide substrate comprising
    first and second major faces and an edge face there between into which light from a light source is injected, the lightguide substrate configured to transfer the light between the first and second major faces by total internal reflection,
    an optical axis generally parallel to the first and second major faces and defining a nominal illumination direction through the lightguide, and
    an extraction region for extracting light from the lightguide; and
    at least one feature formed on at least one of the first and second major faces between the edge face and the extraction region, said at least one feature configured such that a beam of light incident on the at least one feature is refracted back into the lightguide at a lower angle to the optical axis than the incident beam, wherein the lightguide comprises a tapered section adjacent to the edge face that creates an exit point at which light exits from the lightguide, and the at least one feature is located at the exit point so as to re-couple light exiting from the lightguide back into the lightguide.

22. A method for improving collimation in a lightguide that includes first and second major faces between which light is reflected by total internal reflection, a first region for receiving light from a light source, a second region for extracting light from the lightguide, and an optical axis generally parallel to the first and second major faces that defines a nominal illumination axis of the light, the light guide further including a plurality of features arranged between the first and second region, the method comprising refracting a majority of light injected from the light source and incident on the plurality of features back into the lightguide, wherein, relative to the optical axis, an angle of the refracted light after entering back into the lightguide is lower than an angle of light incident on a face of the lightguide prior to the light exiting the lightguide to reduce an angular spread of light relative the optical axis.

23. The method according to claim 22, wherein refracting includes the incident beam exiting the lightguide at a first surface of a feature of the plurality of features, passing through an external medium, and reentering the lightguide at a second surface of the feature of the plurality of features.

24. The method according to claim 23, wherein refracting further includes light from said incident beam, prior to exiting the lightguide, impinging on first surface at a first angle relative to the optical axis, and upon entering the external medium light from said incident beam is refracted at a second angle relative to the optical axis, wherein the second angle is less than the first angle, and upon entering back into the lightguide at the second surface, light from said incident beam is refracted at a third angle relative to the optical axis, wherein the third angle is less than the first angle.

25. The method according to claim 23, further comprising using at least one feature having a triangular cross section.

26. The method according to claim 25, further comprising using at least one feature having a triangular cross section that comprises a non-right angled triangular cross section.

27. The method according to claim 23, further comprising using at least one feature that is lenticular across an entire width of the lightguide.

28. The method according to claim 23, further comprising using at least one feature that is lenticular in a predetermined position on the lightguide.

29. The method according to claim 22, wherein the lightguide comprises a tapered section in the first region that creates a light exit point, further comprising re-coupling light exiting from the light exit point to the lightguide.

30. The method according to claim 29, wherein recoupling includes using at least one feature at the light exit point.

31. The method according to claim 23, further comprising using a plurality of features on at least two different surfaces of the lightguide, and a number of features on a first surface of the at least two different surfaces is different from a number of features on a second surface of the at least two different surfaces.

32. The method according to claim 23, further comprising using a plurality of features on at least two different surfaces of the lightguide, wherein the features on the first and second sides are positionally offset relative to one another.

* * * * *